June 2, 1953

W. G. SCHUTT 2,640,579

CONVEYER

Filed April 3, 1948

INVENTOR.
Walter G. Schutt
BY
Barney, Kissell, Laughlin & Raisch
ATTORNEYS.

June 2, 1953  W. G. SCHUTT  2,640,579
CONVEYER

Filed April 3, 1948 5 Sheets-Sheet 3

INVENTOR.
Walter G Schutt
BY
Barnes, Kisselle, Laughlin & Raisch
ATTORNEYS.

June 2, 1953          W. G. SCHUTT          2,640,579
CONVEYER

Filed April 3, 1948          5 Sheets-Sheet 4

INVENTOR.
Walter G. Schutt
BY
*Barnes, Kisselle, Laughlin & Hirsch*
ATTORNEYS.

June 2, 1953 — W. G. SCHUTT — 2,640,579
CONVEYER

Filed April 3, 1948 — 5 Sheets-Sheet 5

INVENTOR.
Walter G. Schutt
BY
ATTORNEYS.

Patented June 2, 1953

2,640,579

UNITED STATES PATENT OFFICE 2,640,579

CONVEYER

Walter G. Schutt, Adrian, Mich., assignor to Stearns Manufacturing Company, Adrian, Mich., a corporation of Michigan Application April 3, 1948, Serial No. 18,798

4 Claims. (Cl. 198—32)

1

This invention relates to material handling, especially material handling involving material on pallets. More specifically, the invention is designed for handling concrete or cement blocks that are molded in an automatic machine and delivering the blocks to racks and returning the pallets to a conveyor which feeds the empty pallets back into the block molding machine.

By the method and means hereinafter to be described and claimed, it is possible to handle two pallets of molded blocks at a time. They are taken out of the molding machine two pallets at a time, placed in the curing rack and then another set of pallets is returned to a conveyor by which they are delivered to the rear of the machine and again fed thereinto. The means and the method are so timed that while the machine goes through two cycles, molding a set of blocks on a pallet at each cycle, two pallets and two sets of blocks are taken at one time from the front of the machine, placed in the rack and two empty pallets are returned to the conveyor to be conveyed around the machine to the rear.

Referring to the drawings.

Figure 1:
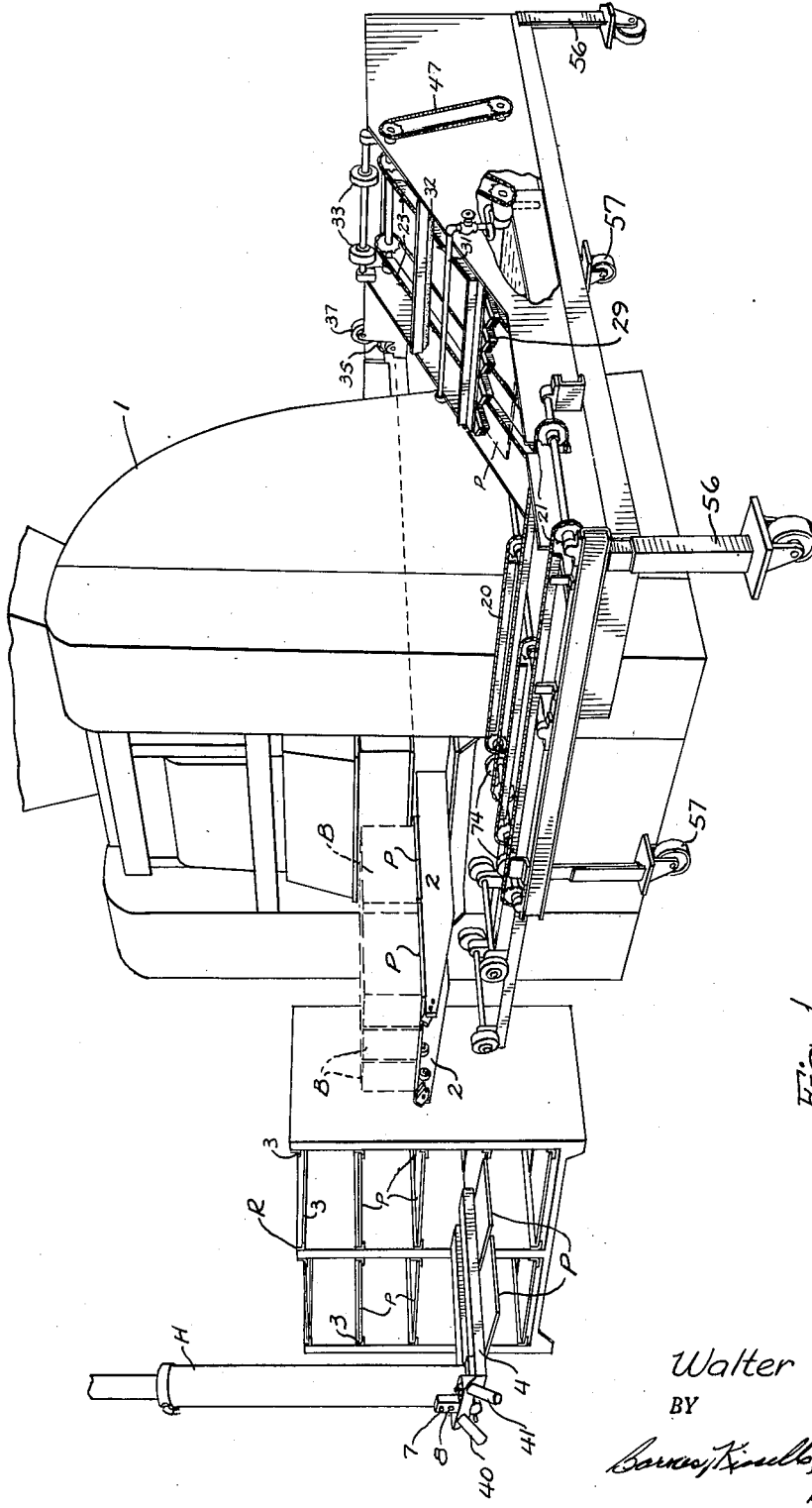
Figure 1 is a perspective of a concrete block molding machine showing the conveyor, the curing rack and the hoist.

The concrete molding machine is not shown in detail in the drawings and will not be here described in detail. Suffice it to say that the machine is provided with proper conveyor or pusher elements to push a pallet out of a stack in a magazine, lower a mold box onto the pallet, convey a charge of cementitious aggregate from a hopper to a position over the mold box and then dump the material into the mold box. Thereupon the mold box is vibrated and the packing head is moved over and down onto the contents of the mold box and also vibrated. The packing head is moved out of the way, the mold box and cores are stripped off the finished blocks, then the pallet with the finished blocks is moved forward out of the front of the machine. A new pallet is then moved forward under the mold box and the cycle of operations is repeated. A machine for accomplishing this is described and claimed in my prior application Number 2,233, filed January 14, 1948, entitled "Machine and Method for Molding Concrete Blocks or Other Products."

Such a machine is shown at 1 in Figure 1, but it might be any design of machine capable of feeding pallets through the machine, loading the molds and separating them from the finished blocks and moving the blocks out of the machine as shown in Figure 1 of the drawings. At the front of the machine are a pair of arms 2 which, together with rollers form a runway over which the pallet and the blocks are pushed out of the machine as shown in Figure 1. This runway and the arms 2 are of sufficient length to carry two pallets P and two sets of blocks B. A set of blocks will normally be three blocks but it might be any other reasonable number. These blocks are normally pushed out of the machine one pallet at a time and ordinarily, as shown in my prior application and the machine has to be relieved of a pallet and a set of blocks at each cycle. It is the object of my invention to obviate the necessity of taking the blocks out at each cycle. Another feature is that the same man who does the unloading of the blocks and placing them in the curing racks, handles the empty pallets, and no extra help is necessary to get these back to the machine and into the magazine. Hence my material handling means and method is a labor saving factor in operating these molding machines. One man can do the work of handling the loaded and empty pallets where previously two have been required.

R is a curing rack which comprises a plurality of vertical walls having angle irons or open shelves 3 on their sides to support the edges of the pallets P when the pallets are pushed into the rack. These curing racks are filled with pallets loaded with block and then each is picked up by an industrial truck and moved to a place which is out of the way. When the blocks have been cured the blocks are unloaded from the pallets and the rack with empty pallets is trucked back to the machine.

Figures 10, 11:
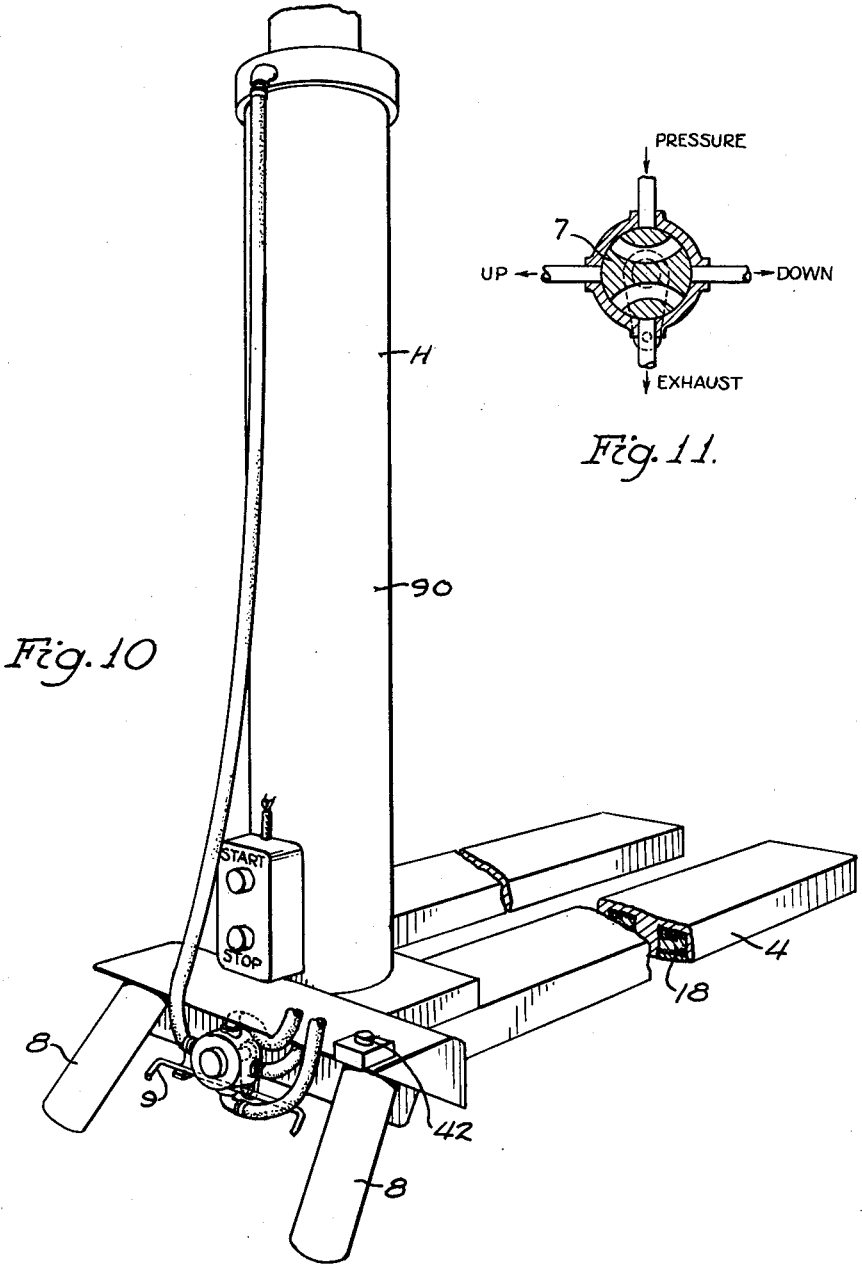
Figure 10 is a perspective of the hoist or "off-bearer" showing the control for the valves and the switches that control the magnet and the block making machine.
Figure 11 is a detail section of the fluid control valve.

In handling these pallets I use a hoist or "off-bearer" H which includes a pair of long horizontal arms 4. The hoist is fluid operated by the fluid coming through hoses and the lift can be controlled by the two-way valve 7 shown in detail in Figure 11. This valve can be controlled in any desired way from the hand grip 8. I have shown a shifting bar 9 for this purpose.

Figure 6:
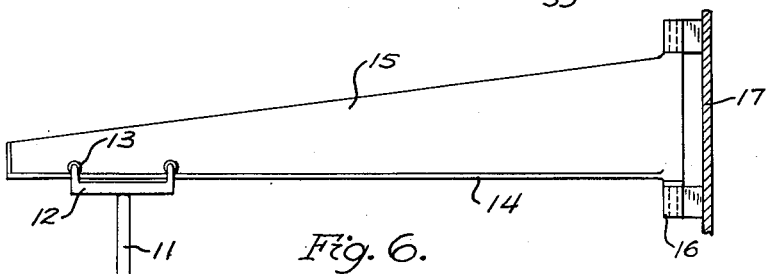
Figure 6 is a view of the hoist or "off-bearer" and the swinging beam or track on which a carriage supports the hoist.

It will be seen that the hoist or "off-bearer" H comprises a cylinder 90 in which is piston 10 (Figure 6). By supplying air above or below the stationary piston 10 cylinder 90 is raised and lowered on the vertical rod or post 11 which is secured at its upper end to the carriage 12 having rollers 13 which roll on the track 14 or beam 15 pivoted on the knuckle 16 supported on a beam or wall 17.

Figure 3:
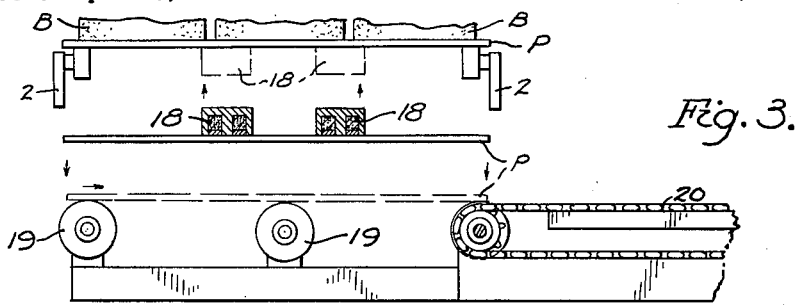
Figure 3 is a view somewhat diagrammatic showing how the pallets are dropped on the conveyor and then the arms of the hoist are lifted to take from the machine another pallet loaded with blocks.

From the above cursory description it will be seen that the arms 4 can be raised and lowered, the hoist can be moved to any place within a given area by reason of the carriage rolling on the track 14 and the arm or beam 15 swinging on its pivot. This enables the arms to be brought over and placed under the pallets on the runway leading out of the machine. Two pallets may be taken up by the arms 4 and then taken over to the rack R and the pallets set on the open shelves formed by the angle irons 3. Thereupon a load of empty pallets can be picked up electromagnetically as shown in Figure 1 inasmuch as these arms are electromagnets by reason of the wiring 18 in the arms which may be energized with the current whose inductive field will magnetize the arms and allow them to carry the pallet as shown in Figure 3. By momentarily discontinuing the current by pressing switch 42 the pallet may be dropped onto the rollers 19 and 74. These latter are keyed to shaft 54 which is power driven and these rollers 74 pull the pallets along.

Figure 2:
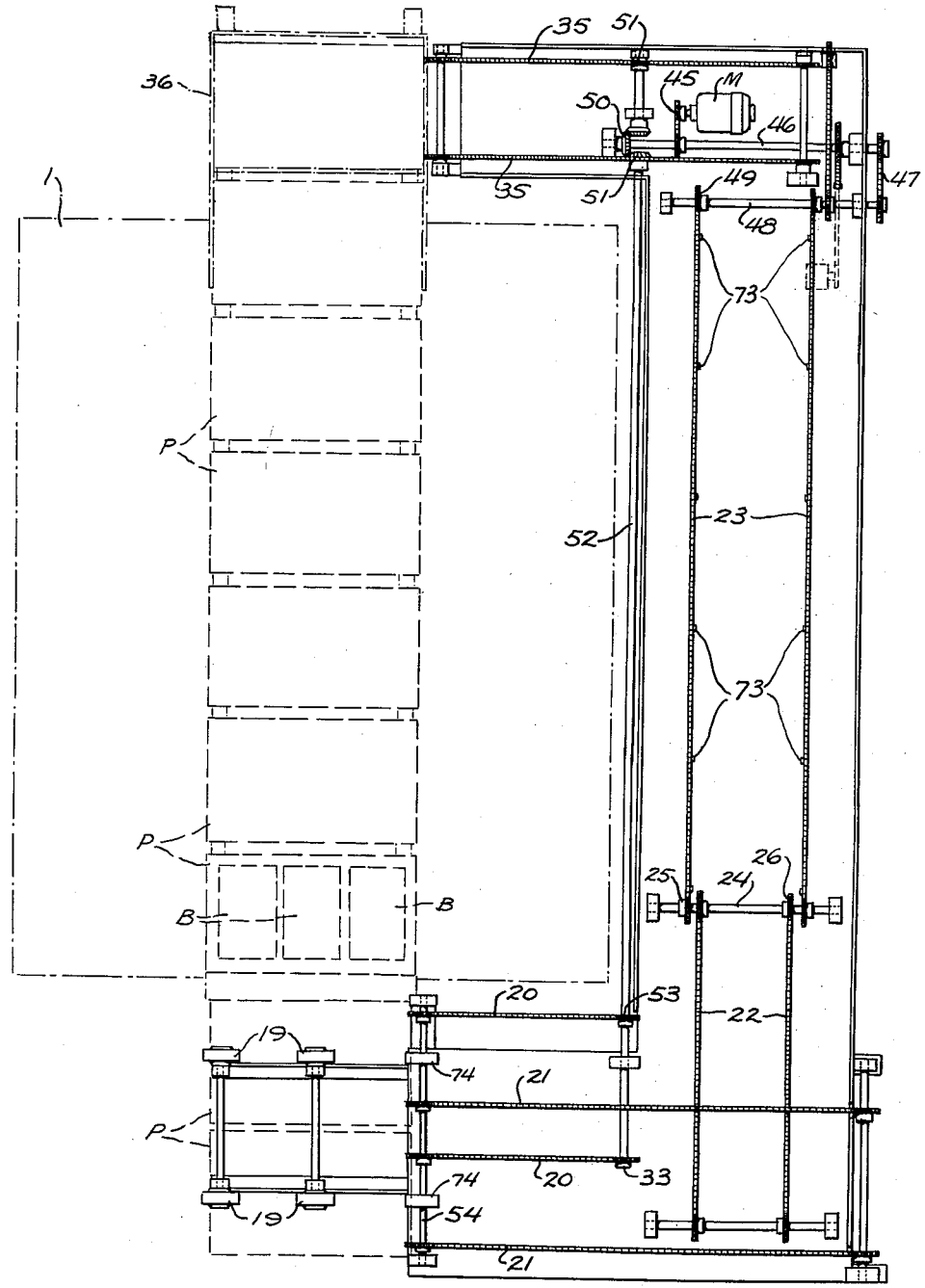
Figure 2 is a plan view of the machine shown diagrammatically and a plan view of the conveyor.
Figure 4:
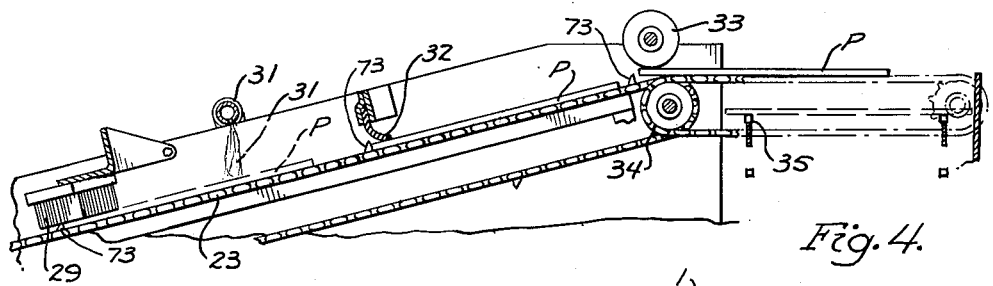
Figure 4 is a side elevation of the reargoing conveyor section showing the pallet in the process of being brushed, oiled and the oil wiped over the pallet.

Now refer to Figure 2. It will be seen that two of the chains or "flexible linear" members are short members 20. The other two chains are long chains 21. The short chains extend to near the rear-going conveyor chains 22 while the long chains 21 extend over and beyond the rear-going chains 22. Hence when the pallets travel across the front of the machine, by reason of the short chains 20, the rear portion of the pallet will have one edge unsupported when the pallet runs off the short chain the rear edge will be dropped onto the rear-going conveyor chains 22 and these rear-travelling conveyor members will take hold of the pallet and start it rearwardly. After the pallet has gone rearwardly a short distance on the rear-going conveyor, the pallet starts upwardly with another set of chains 23 with upwardly projecting lugs 73 driven by the same shaft with the conveyor chains 22 by sprockets 25 and 26. This conveyor leads the pallets under the brushes 29 (see Figures 1 and 4) which scour the pallet of foreign material. These brushes could rotate.

The pallet passes under an oil spray pipe 30 which discharges oil jets 31. The pallet then passes under the rubber wiper 32 which distributes the oil over the pallet. It is desirable to have this oil on the pallet so that the blocks will not stick to the pallet.

Figure 5:
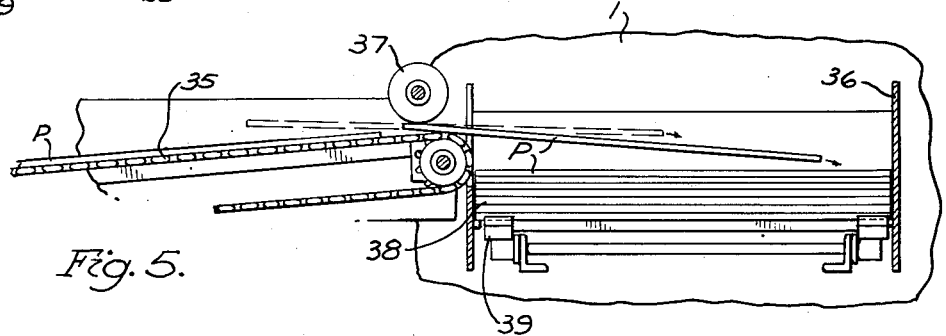
Figure 5 is a side elevation of the rear section of the conveyor showing the pallets being dumped into the pallet magazine.

After the pallet has been carried up this upwardly inclined conveyor it reaches a guide roller 33 while the chain passes over the sprocket 34. This serves, by reason of the spacing of the sprocket chain and the guide roller 33, to hold the pallet in a position (see Figure 4) until such time as the pallet passes out from under roller 33. Thereupon the pallet drops onto the rear conveyor chains 35 and can be carried upwardly to a position above the pallet magazine 36. Another guide roller 37 holds the pallet in this extended or "cantilever" position as shown in Figure 5 until the pallet passes off the conveyor when it drops down onto the stack of pallets 38 in the magazine. Thereupon a reciprocating pusher 39 (the details of which are not shown) picks up the lowermost pallet and starts it passing through the machine.

The conveyor chains (more broadly termed "flexible members") are driven by a motor M, Figure 2, which by gears 45 drive shaft 46, which in turn through chain and sprocket wheels 47 drives shaft 48 which through sprockets 49 drives the rear going conveyor chains 23. Shaft 46 throw bevel gears 50, drives the sprocket wheels 51 which drive the rear conveyor chains 35. Another shaft 52 drives the short conveyor chains 20 which in turn drive shaft 54 which drives the long front conveyor chains 21. The whole conveyor unit is mounted on legs 56 which are supported on caster wheels 57 so that the whole conveyor unit can be shifted when desired.

Figure 7:
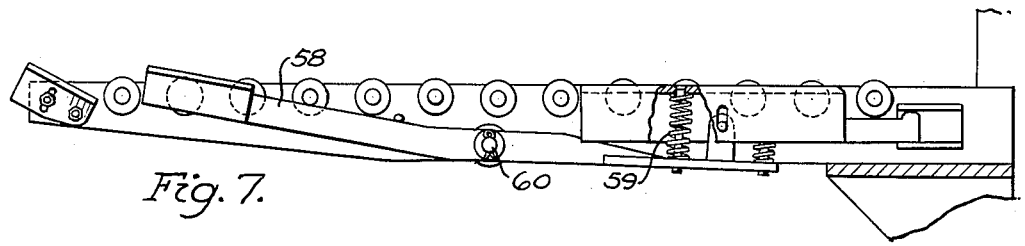
Figure 7 is a side view partly in section of the extended arms or runway for the pallets and blocks pushed out of the front of the machine. The arms are empty.
Figure 8:
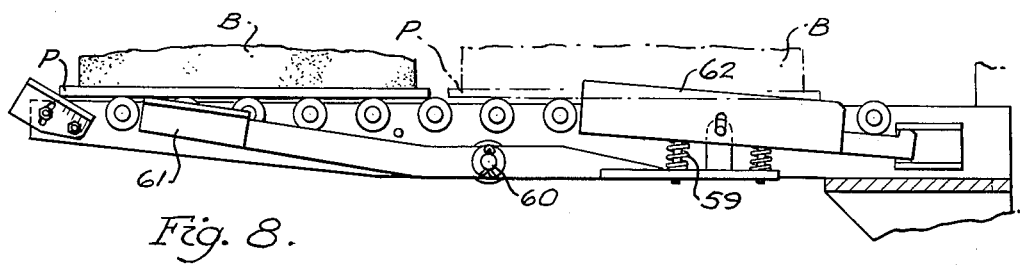
Figure 8 is a similar view showing these arms or runway bearing pallets and blocks.
Figure 9:
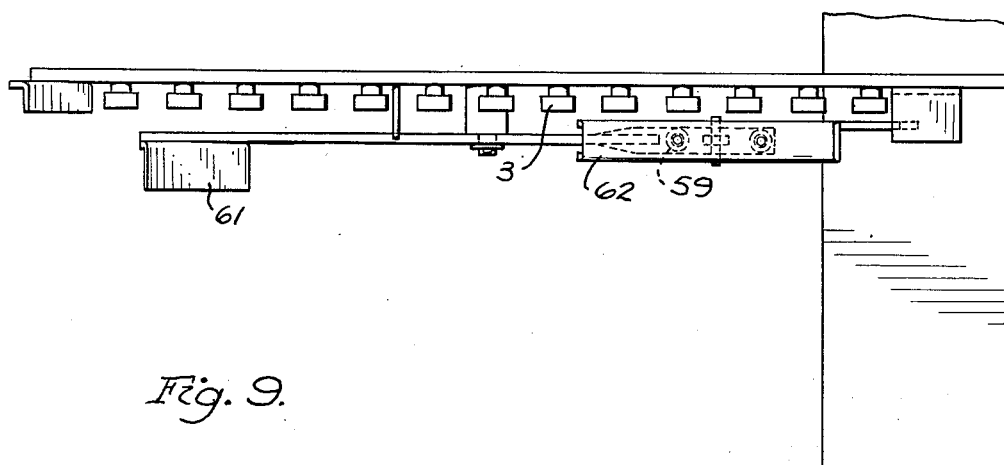
Figure 9 is a plan view of this set of arms or runway.

Referring to Figures 7, 8 and 9, a brake arm 58 is forced upwardly by spring 59. The arm 58 is pivoted at 60 when the first pallet P is pushed out to its final position as shown in Figure 8. This depresses the shoe 61 on the arm and this pushes up the braking member 62 to the position shown in Figure 8 where the brake is tipped up slightly and, consequently, when the second pallet P is forced out of the machine this will act as a drag on the pallet and prevent the pallet from overthrowing and bumping and forcing off the rolls the pallet and load ahead.

It will be seen from this arrangement that one operator can use the hoist with its automatic lifting and dropping to get under two pallets, lift them off the runway out of the machine, place the loaded pallets on the open shelves of the curing rack, and thereupon he can drop the hoist with its two magnetic arms down and take the empty pallets from another shelf and convey them back to the front conveyor section. They are then pulled across the front of the machine on the conveyor, then tip off onto the rear-going conveyor section where the pallets are brushed, automatically oiled and the oil distributed by a wiper. Thereafter the pallets reach the rear-going section of the conveyor and are carried across the rear of the machine and finally dropped off into the machine pallet magazine, whereupon the automatic mechanism of the block molding machine takes hold and starts the lowermost pallet in the stack back into the machine in which a new set of blocks is molded on the pallet in the manner already described.

From the above illustration and description it will be apparent that the machine can be run at maximum speed and only one man is required to attend the machine for feeding the pallets and handling the product of the machine.

In many of the broader claims a conveyor for transporting the pallets "around" the machine is called for. By the term "around" I desire it to be understood that this means around on all sides, that is the pallets can be conveyed around the sides of the machine, over the machine or under the machine from front to back.

What I claim is:

1. A pallet conveyor for transporting empty pallets around a concrete or cement block molding machine having in combination, a front run of spaced travelling flexible linear members arranged to take at one time side by side two pallets dropped thereon paired crosswise the linear members, a rear-going run of flexible linear members in cross-relation with the front conveyor section onto which the two side by side pallets are dumped by the front conveyor section but one pallet succeeding the other lengthwise on the rear-going conveyor section, a rear conveyor section for location at the back of the machine and in cross-relation with the rear-going conveyor section for taking the single pallets delivered to it by the rear-going section at the cross-over and delivering the same singly to a magazine at the rear of the block machine.

2. A pallet conveyor for transporting empty pallets around a concrete or cement block molding machine having in combination, a front run of two substantially spaced travelling flexible linear members arranged to take at one time side by side two pallets dropped thereon paired crosswise the linear members, a rear-going run of flexible linear members in cross-relation with the front conveyor section onto which the two side by side pallets are dumped by the front conveyor section but one pallet succeeding the other lengthwise on the rear-going conveyor section, a rear conveyor section for location at the back of the machine and in cross-relation with the rear-going conveyor section for taking the single pallets delivered to it by the rear-going section at the cross-over and delivering the same singly to a magazine at the rear of the block machine, and a frame for supporting the travelling flexible linear members and supporting legs for the frame with casters thereon so that the whole frame, including the front, the rear-going section and the extreme rear section, may be moved as a unit with respect to the block machine.

3. A conveyor for transporting plates or pallets comprising a pair of flexible substantially spaced conveyor elements, one of short length and one of longer length, another conveyor angularly disposed with respect to the first mentioned conveyor and having a plurality of flexible conveyor elements located at the end of the short conveyor element of the first mentioned conveyor but the flexible elements of the second conveyor passing under the long conveyor element of the first conveyor whereby plates are conveyed along the first conveyor and above the second conveyor by the long chain of the first conveyor and then the rear edge of the plate drops down onto the flexible conveyor elements of the second conveyor when one edge passes over the end of the short conveyor element of the first conveyor and the pallet is thereupon picked up by the second conveyor and pulled off the long crossing chain of the first conveyor.

4. A plate or pallet conveyor having a conveyor section comprising four longitudinally travelling linear members alternately a short member and a longer member, and a second conveyor section comprising a plurality of longitudinally travelling linear members which are located at the end of the short linear members of the first section and run at substantial right angles thereto but which are located under one or more of the longer linear members of the first conveyor section and thereby in position to take plates or pallets dropping off the short linear members of the first conveyor section and then pull these plates or pallets off the ends of the longer linear members and start them in a right-angular direction in single file.

WALTER G. SCHUTT.

References Cited in the file of this patent

UNITED STATES PATENTS

| Number | Name | Date |
|---|---|---|
| 823,780 | Hodgson | June 19, 1906 |
| 824,943 | Mathews et al. | July 3, 1906 |
| 835,590 | Whiteford | Nov. 13, 1906 |
| 856,966 | Lewis | June 11, 1907 |
| 1,094,645 | Eichinger | Apr. 28, 1914 |
| 1,357,315 | Dypuy | Nov. 2, 1920 |
| 1,406,709 | Wilson | Feb. 14, 1922 |
| 1,452,711 | Schroeder et al. | Apr. 24, 1923 |
| 1,479,866 | Moores | Jan. 8, 1924 |
| 1,543,214 | Luce | June 23, 1925 |
| 1,716,349 | Wallace | June 4, 1929 |
| 2,139,877 | Brandt | Dec. 13, 1938 |
| 2,207,782 | Carlson | July 16, 1940 |
| 2,271,187 | Fortescue | Jan. 27, 1942 |
| 2,282,628 | Whann | May 12, 1942 |
| 2,339,952 | Schleicher | Jan. 25, 1944 |

FOREIGN PATENTS

| Number | Country | Date |
|---|---|---|
| 461,684 | Germany | May 5, 1926 |